Oct. 31, 1961

A. SKROBISCH 3,007,098

HYSTERESIS TYPE SYNCHRONOUS MOTOR

Filed Jan. 8, 1960

INVENTOR.
Alfred Skrobisch
BY James and Franklin
ATTORNEYS

Oct. 31, 1961  A. SKROBISCH  3,007,098
HYSTERESIS TYPE SYNCHRONOUS MOTOR
Filed Jan. 8, 1960  4 Sheets-Sheet 4

INVENTOR.
Alfred Skrobisch
BY James and Franklin
ATTORNEYS

United States Patent Office

3,007,098
Patented Oct. 31, 1961

3,007,098
HYSTERESIS TYPE SYNCHRONOUS MOTOR
Alfred Skrobisch, Huntington Station, N.Y. (% Allard Instrument Corp., 146 E. 2nd St., Mineola, N.Y.)
Filed Jan. 8, 1960, Ser. No. 1,225
6 Claims. (Cl. 318—266)

This invention relates to synchronous motors, and more particularly to synchronous motors of the hysteresis type.

Small synchronous motors of the hysteresis type are widely used. They employ a field winding like an induction motor, providing a rotating field. The rotor is a hollow cylinder made of a permanent magnetic material usually 17% cobalt steel. The rotor comes up to speed quickly, and then locks in step. Such a motor has many advantages, but it has the disadvantage of inefficiency, it being only about 35% efficient as commercially made, and therefore is used only in small motors where efficiency is not important.

The primary object of the present invention is to generally improve such synchronous motors, and a more particular object is to greatly improve the efficiency thereof. This is done by employing a magnetic material of high residual flux density and high coercive force, for example Alnico II. This material is much harder to magnetize than the conventional cobalt steel. It requires many more ampere turns of field winding, and if sufficient field is provided to synchronize the rotor, either it will burn out the windings after the motor is running, or will result in an unnecessarily inefficient motor once synchronized.

Accordingly, a corollary object of the present invention is to overcome this difficulty, and to provide a novel hysteresis type synchronous motor and novel starting circuitry, with both the motor and starting circuitry improved for the present purpose. To this end the rotor material is changed, for example, to Alnico II; each field coil is made double, and the switching arrangement connects the two coils in parallel during starting and in series after the motor has come up to speed. A strong torque is provided, even with the field coils in series instead of in parallel, because of the very strong magnetic properties of the Alnico II rotor. A quick start is provided, despite the difficulty of magnetizing the Alnico II material, because the field is four times as powerful during starting as during running.

In accordance with a further feature and object of the invention, the switching operation does not interrupt the energization of at least one set of field coils, so that there will be no loss of synchronism when changing from parallel to series operation. In preferred form the field is changed from quadruple strength to double strength to single strength.

A further object of the invention is to provide a number of switching arrangements to accomplish the desired purpose. Still another object is to apply the invention to a motor of either the shaded pole type or the split phase type.

To accomplish the foregoing objects, and other more specific objects which will hereinafter appear, my invention resides in the motor with associated starting circuitry, and the relation of one to the other, as are hereinafter more particularly described in the following specification. The specification is accompanied by drawings in which:

FIG. 1 schematically shows a split phase motor embodying features of my invention;

FIGS. 2, 3, 4, and 5 show successive stages in the switching of the motor coils during starting;

Figure 1:
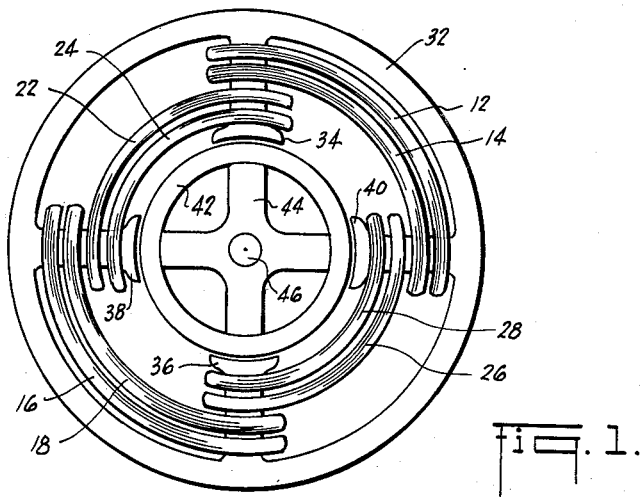

Referring to the drawing, and more particularly to FIG. 1, the hysteresis type synchronous motor of my invention comprises a stator having the usual yoke 32 with two or more pairs of teeth, in this case a pair of teeth 34, 36, and another pair of teeth 38, 40. The usual field coil placed around the teeth 34 and 40 is here replaced by a pair of coils 12 and 14. It will be understood that these may constitute a single physical or tape wrapped body, but that leads are brought out making it possible to treat the winding as a pair of windings for switching purposes. Also, a bifilar winding may be used, with four leads coming out of the coil.

If coils 12 and 14 are considered to provide a north pole, an opposite south pole is provided by a similar pair of coils 16 and 18.

As usual in a split phase motor, another winding is placed around the teeth 34 and 38, and in the present motor this winding is replaced by a pair of coils 22 and 24. If these are considered north, then the corresponding south coils are shown at 26 and 28, these being placed around the teeth 36 and 40.

The rotor is made up of a cylinder 42 made of a magnetic material of high residual flux density and high coercive force, for example Alnico II. Alnico III and Alnico IV also may be used but Alnico II is preferred. The cylinder is mounted on a spider 44 which may be made of aluminum or other nonmagnetic material. The spider is carried on a shaft 46. The rotor may be of generally conventional design, except for the use of Alnico II for cylinder 42, in lieu of the usual 17% cobalt steel.

Figure 2:
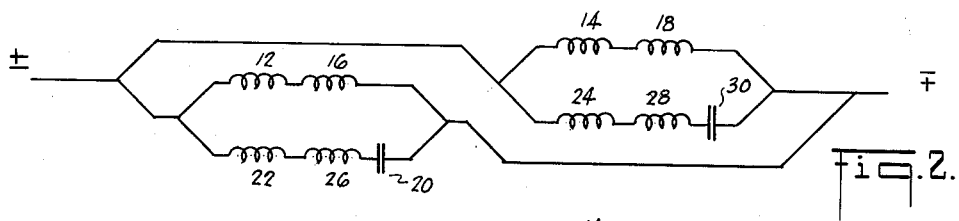

Referring now to FIG. 2, the coils 12 and 16 are connected in series for one phase, and the coils 22 and 26 are connected in series for the other phase. In theory the present invention is applicable to motors having a regular two-phase supply, or a three-phase supply, but in practise these small motors are usually energized by single phase current, and to provide a split phase, a capacitor is connected in series in order to shift one phase relative to the other. In FIG. 2 this capacitor is shown at 20.

As so far described these parts would constitute the entire field of these motors as previously made (when using a stator having four teeth). In accordance with the present invention these parts are duplicated by the coils 14 and 18 for one phase, and the coils 24 and 28 with their separate series capacitor 30 for the other phase. FIG. 2 shows the circuitry during starting, and it will be seen that the doubled coils are connected in parallel, so that they provide maximum ampere turns in order to powerfully energize the field, and consequently to successfully and adequately magnetize the Alnico II rotor which otherwise would be difficult to magnetize.

Figure 3:
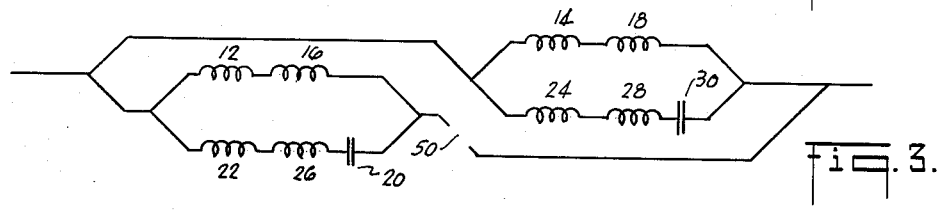
Figure 4:
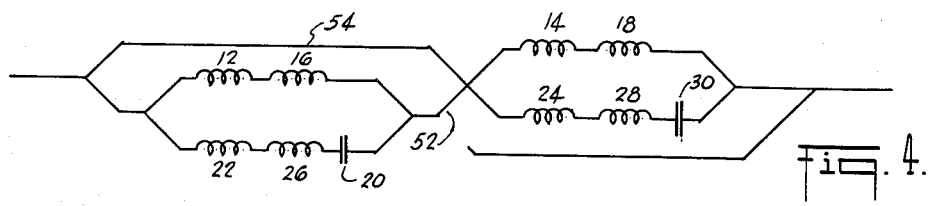

The motor comes up to speed in say one second, following which the switching proceeds in stages next described. In FIG. 3 one set of field coils has been disconnected, as shown at 50. At this time the motor is kept running in synchronism by the other set of field coils. In FIG. 4 the disconnected field coils have been short-circuited and connected in series with the other set, this being done by reason of a connection at 52, with the coils 12, 16, 22, 26 being short-circuited by line 54. The operation at this time is the same as in FIG. 3; that is the field is maintained by one set of field coils, supplied with full line voltage. The field strength then is approximately half of what it is in FIG. 2.

Figure 5:
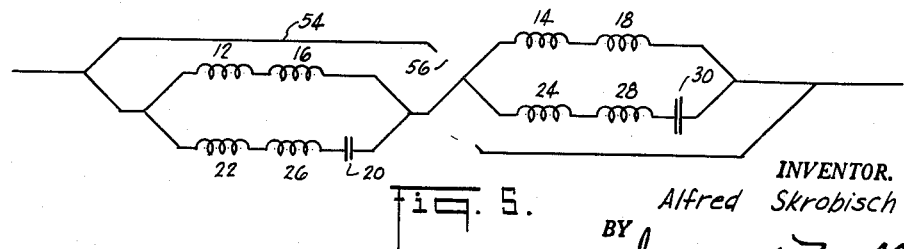

Referring now to FIG. 5, the short circuit provided by line 54 has been opened at 56, thus leaving the two sets of field coils in series. There is no interruption of the energization of the stator during the entire switching operation, and therefore no loss of synchronism. At this time the field strength is approximately one-half of what it is in FIGS. 3 and 4, and one-quarter of what it is in FIG. 2. Nevertheless, it is adequate to provide the desired motor torque, because of the superior magnetic properties of the rotor.

It should be noted that each of the sets of field coils has its own phase-splitting condenser. This is needed in order to make possible the desired switching procedure.

Figure 6:
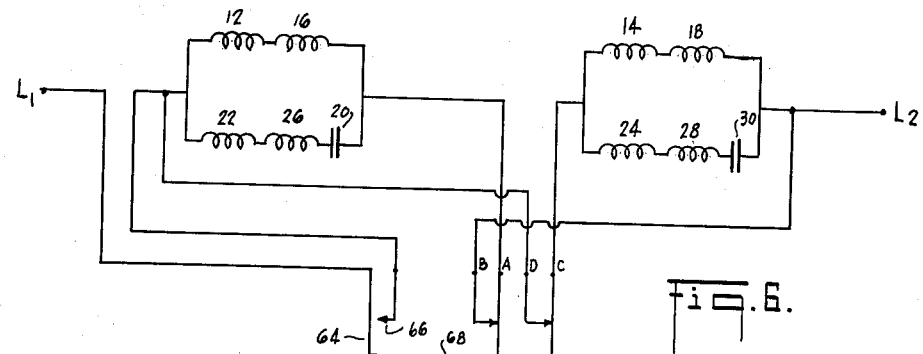
FIG. 6 is a wiring diagram showing the use of a manually operated starting switch, with the field coils in parallel.
Figure 7:
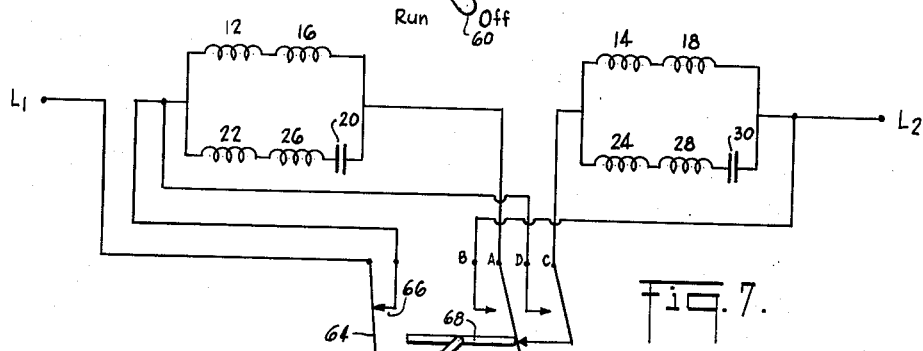
FIG. 7 is a similar diagram, with the switch moved to connect the field coils in series.

This desired switching may be performed manually, as shown in FIGS. 6 and 7. In FIG. 6 the coils and capacitors have been given the same numerals as before. The switch is operated manually by means of a handle or lever 60 pivoted at 62. The main power supply is controlled by contacts 64 and 66 which are open when lever 60 is in its right hand or "off" position, and which are closed as soon as the lever begins to move towards its "run" position. When contacts 64 and 66 are closed, the two sets of field coils are connected in parallel as desired, because contact A is closed to B, and contact C is closed to D.

When starting, lever 60 is moved all the way to its left or "run" position, where it holds because of any conventional toggle or detent action. Contact A then is closed to contact C, and contact C leaves contact D, as shown in FIG. 7. At this time the circuitry is readily traced to show that the two sets of field coils are connected in series across the line L–1, L–2.

To avoid undue repetition, the diagram has been drawn only twice for the two main positions, the initial starting position with the field coils in parallel, and the ultimate running position with the field coils in series. However, there are two intermediate stages which fulfill the preferred operation shown in FIGS. 2, 3, 4, and 5. For this purpose the operating bar 68 causes contact A to leave contact B before affecting contact C. Thus the set of coils 12, 16, 22, 26, is de-energized while the other set remains energized. Contact A next engages contact C, thereby connecting the two sets in series, and short circuiting the unused set of coils. Finally contact C leaves contact D, thereby opening the short circuit.

Figure 8:
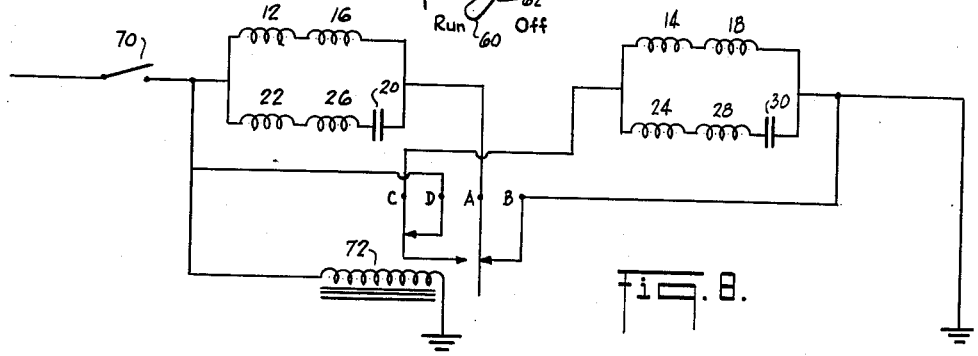
FIG. 8 is a wiring diagram showing the use of a time delay relay, with the field coils in parallel.
Figure 9:
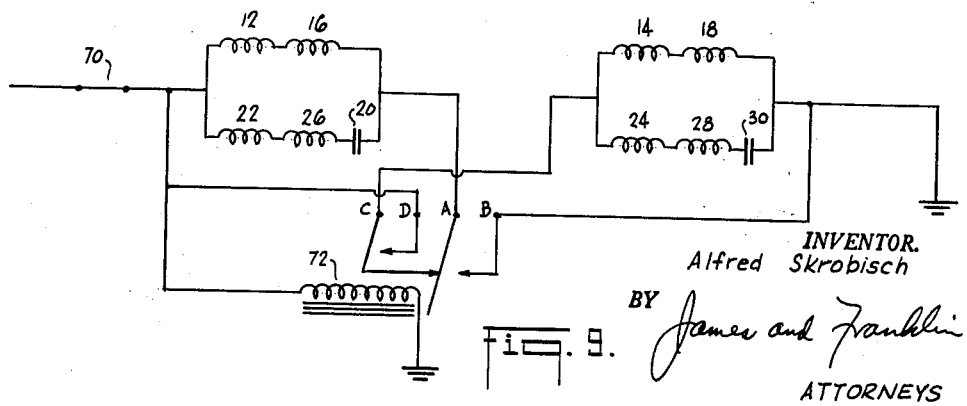
FIG. 9 is a similar diagram, with the relay moved to connect the field coils in series.

Similar switching may be provided with the aid of a time-delay relay, and such an arrangement is shown in FIGS. 8 and 9. The field coils and capacitors carry the same numerals as before. The operator controls a main switch 70. When this is closed the relay coil 72 is energized along with the motor. At this time the sets of coils are connected in shunt, and the contacts A, B, C, and D correspond to those shown in FIGS. 6 and 7. Such a group of contacts is commercially available and is known in the trade as a "Form E."

After a brief delay, say a second, the contact A is drawn to the left by the relay coil 72, and the switch contacts assume the relation shown in FIG. 9 in which the two sets of field coils are connected in series instead of in parallel. Moreover, the disposition and placing of the contacts is made such that during the change from the parallel to the series relation, one set is disconnected while the other remains connected; the disconnected set is short-circuited and connected in series; and finally the short circuit is opened, so that the coils are changed from parallel to series with no interruption in the energization of the stator.

Figure 10:
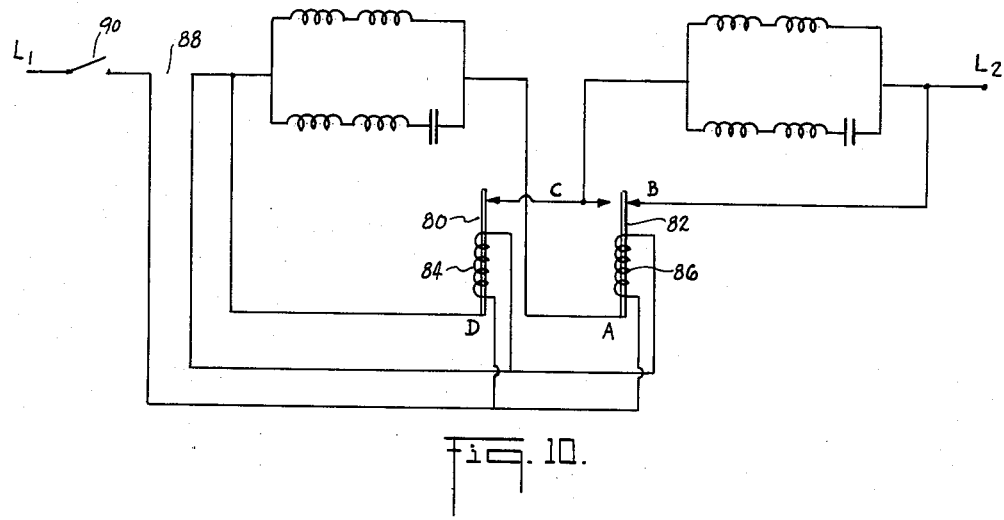
FIG. 10 is a wiring diagram showing the use of thermally actuated switches, with the field coils in parallel.

The switching also may be performed with the aid of thermostatic switches, such as those commonly used for protection against motor overheat. In commercial form these are single pole switches, and for the present purpose two such switches are needed. One may be single pole single throw, as shown at C, D (FIG. 10), and the other is single pole double throw, make before break, as shown at A, C. The movable elements 80 and 82 are bimetallic elements, of which element 82 would have the faster response time. They are heated by heating coils 84 and 86. These are connected in the main circuit, and preferably are in series with the motor, as shown at 88.

Figure 11:
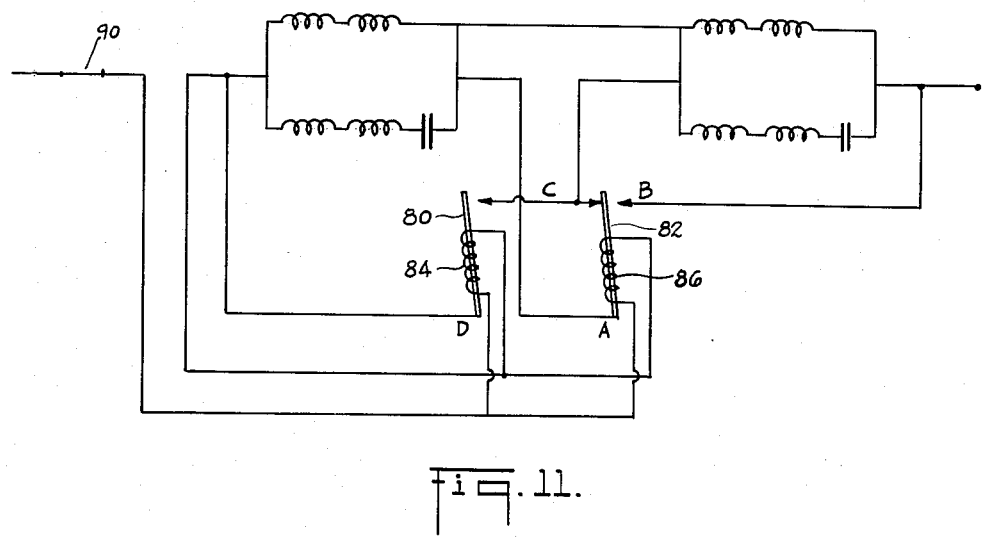
FIG. 11 is a similar diagram, with the switches moved to connect the field coils in series.

The operator controls a main power line switch 90. When this switch is closed the motor is started with the two sets of field coils connected in parallel, as will be seen in FIG. 10. At the same time current passes through the heating coils 84 and 86 and quickly thereafter the thermostat switches move from the right position shown in FIG. 10 to the left position shown in FIG. 11, at which time the field coils are connected in series.

Here again the spacing and disposition of the individual contacts B and C relative to the movable elements 80 and 82 preferably is made such, or differently expressed, the relative response times of elements 80 and 82 should be as described above, so that one set of field coils is disconnected without disconnecting the other, and the disconnected set is short-circuited and connected in series with the other set, following which the short circuit is opened, so that the entire transition from parallel to series relation is made with no interruption of the energization of the stator.

The thermostatic switches preferably are connected in series with the motor, because in that case their heating by the series connection current, while sufficient to keep the switches in desired position during normal operation, is relatively reduced. Then when the motor is stopped there is quicker cooling, so that the switches are quickly ready to operate as starting switches when the motor is again started. It may be noted that if the motor is too quickly restarted, that is, before the switches reset themselves, the motor may fail to accelerate its load to synchronism, but the motor will not burn out while the series connection is maintained.

Figure 12:
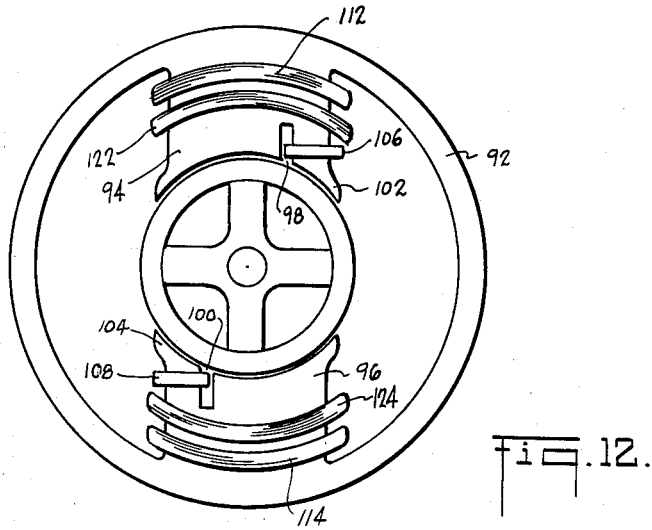
FIG. 12 is a schematic drawing showing the invention applied to a motor of the shaded pole type.

As so far described, the motor is assumed to be a split phase motor, but the invention is also applicable to a motor of the shaded pole type. Such a motor is schematically shown in FIG. 12, it comprising a stator having a yoke 92 with main poles or teeth 94 and 96. These are slotted at 98 and 100 to provide shaded poles 102 and 104 which receive a closed loop or shading coil or rings 106 and 108.

Here again, the main field coils are double (or may be bifilar wound), thus providing north and south coils 112 and 114 and companion north and south coils 122 and 124.

Figure 13:
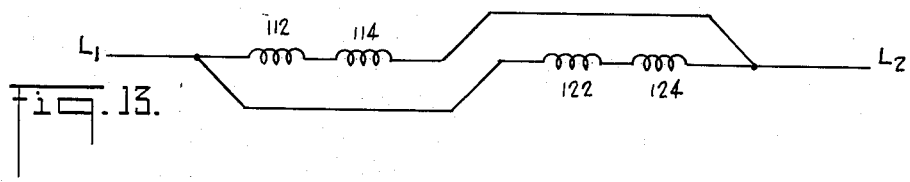
FIGS. 13–16 are generally like FIGS. 2–5 in showing successive stages in the switching operation as applied to the motor of FIG. 12.
Figure 14:
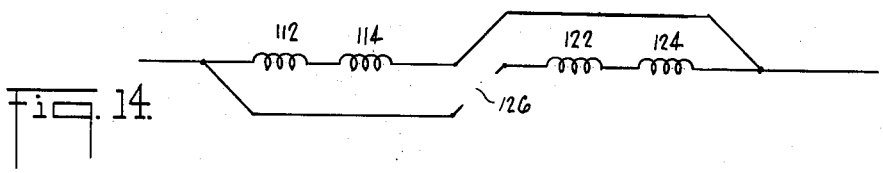
Figure 15:
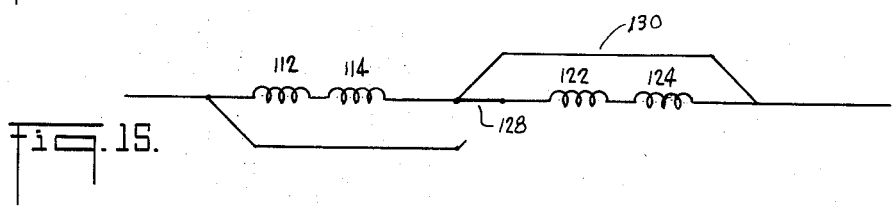
Figure 16:
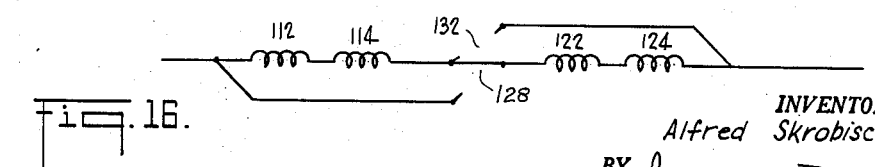

These are switched exactly as previously described, and the switching steps are illustrated in FIGS. 13–16, which are comparable to FIGS. 2–5. In FIG. 13 the first set of field coils 112, 114 is connected in parallel with the second set of field coils 122, 124. In FIG. 14 the set 122, 124 has been de-energized by an open circuit at 126, while the set 112, 114 is still connected in circuit. In FIG. 15 the disconnected coils 122, 124 have been connected in series as shown at 128, and at the same time are short-circuited by the line 130. In FIG. 16 the short circuiting line 130 has been opened at 132, thereby putting the two sets of field coils again into operation, but now connected in series instead of in parallel.

Thus, initially the field is energized at about double strength, as shown in FIG. 13. During the switching it is energized at about normal strength (for a 17% cobalt steel rotor) as shown in FIGS. 14 and 15. At the end of the switching it is energized at half strength as its normal running strength, as shown in FIG. 16. This is possible because the field strength required for use with the Alnico II rotor is about half that normally used for the 17% cobalt steel rotor. On the other hand, during starting of the motor the field strength is doubled relative to that used for cobalt steel, or quadrupled relative to that used here for Alnico in normal running condition.

It is believed that the construction and the method of use of my improved synchronous motor and starting circuitry, as well as the advantages thereof, will be apparent from the foregoing detailed description. One advantage is its high efficiency of say 70%, instead of the prior 35%. There is only a relatively weak magnetic field around the motor, with less effect on surrounding equipment, such as a tape recorder or phonograph, etc., in which such synchronous motors are commonly used. Another advantage in many fields of use is that the motor, if overloaded, will stop instantly instead of gradually slipping to a speed below synchronism. The usual hysteresis motor begins to slip or slow down smoothly, and the change in speed may not be noticed. In many types of equipment this may upset measurements or other desired results seriously over a considerable period of time before the difficulty is discovered. It is preferable to have the motor stop completely, so that the difficulty will be instantly noticed and corrected. In the present motor the magnetizing current during normal running is too small to maintain a reduced rotor speed, once synchronism is lost, and the motor stalls. However, no burn out will occur in the stalled condition, because of the low input to the field coils when they are connected in series.

It will be understood that while, for simplicity, the split phase motor has been shown with four stator teeth carrying four double coils (eight in all), and the shaded pole motor has been shown with two poles and two double coils (four coils in all), these motors may be, and frequently are, made with more poles and coils. Thus the split phase motor is frequently made with eight teeth, in which case, for the present purpose, it would have eight double coils or sixteen coils in all.

The thickness of the Alnico cylinder wall varies with the number of poles used. The more poles used, the thinner the rotor wall may be. In this respect the design is similar to what takes place when using 17% cobalt steel.

It will be apparent that while I have shown and described my invention in several preferred forms, changes may be made in the structure shown, without departing from the scope of the invention as sought to be defined in the following claims. In the claims there is some reference to the switching of a first set of field coils and a second set of field coils, but it will be understood that either set may be the set which is disconnected and subsequently reconnected in series.

I claim:

1. A hysteresis type synchronous motor with starting circuitry, said motor comprising a stator with one or more pairs of poles, a first set of field coils on said poles, a second set of field coils on the same poles, a rotor having a cylinder made of a magnetic material of high residual flux density and high coercive force, thermostatically operated switch means to connect the first and second sets of field coils in parallel when the motor is being started, and in series after the motor has come up to speed, said switch means including a heater, and a main power supply switch to close the circuit to said heater and said motor.

2. A hysteresis type synchronous motor with starting circuitry, said motor comprising a stator with one or more pairs of poles, a first set of field coils on said poles, a second set of field coils on the same poles, a rotor having a cylinder made of a magnetic material of high residual flux density and high coercive force, thermostatic switches to connect the first and second sets of field coils in parallel when the motor is being started, and in series after the motor has come up to speed, said switches having heaters connected in series with the motor, and a main power supply switch to close the circuit to said heaters and said motor.

3. A hysteresis type synchronous motor with starting circuitry, said motor comprising a stator with one or more pairs of poles, a first set of field coils on said poles, a second set of field coils on the same poles, a rotor having a cylinder made of Alnico II or equivalent magnetic material, thermostatic switches to connect the first and second sets of field coils in parallel when the motor is being started, and in series after the motor has come up to speed, said switches having heaters connected in series with the motor, and a main power supply switch to close the circuit to said heaters and said motor.

4. A hysteresis type synchronous motor with starting circuitry, said motor comprising a stator with one or more pairs of poles, a first set of field coils on said poles, a second set of field coils on the same poles, a rotor having a cylinder made of a magnetic material of high residual flux density and high coercive force, thermostatically operated switch means to connect the first and second sets of field coils in parallel when the motor is being started, to then disconnect the second set of field coils while keeping the first set in circuit so that the motor runs on the first set, to then short circuit and connect the short circuited second set in series with the first set, and to then open the short circuit so that the second set remains in series with the first set, with no interruption of the energization of the stator during the switching, said switch means including a heater, and a main power supply switch to close the circuit to said heater and said motor.

5. A hysteresis type synchronous motor with starting circuitry, said motor comprising a stator with one or more pairs of poles, a first set of field coils on said poles, a second set of field coils on the same poles, a rotor having a cylinder made of a magnetic material of high residual flux density and high coercive force, thermostatic switches to connect the first and second sets of field coils in parallel when the motor is being started, to then disconnect the second set of field coils while keeping the first set in circuit so that the motor runs on the first set, to then short circuit and connect the short circuited second set in series with the first set, and to then open the short circuit so that the second set remains in series with the first set, with no interruption of the energization of the stator during the switching, said switches having heaters connected in series with the motor, and a main power supply switch to close the circuit to said heaters and said motor.

6. A hysteresis type synchronous motor with starting circuitry, said motor comprising a stator with one or more pairs of poles, a first set of field coils on said poles, a second set of field coils on the same poles, a rotor having a cylinder made of Alnico II or equivalent magnetic material, thermostatic switches to connect the first and second sets of field coils in parallel when the motor is being started, to then disconnect the second set of field coils while keeping the first set in circuit so that the motor runs on the first set, to then short circuit and connect the short circuited second set in series with the first set, and to then open the short circuit so that both sets work in series, with no interruption of the energization of the stator during the switching, said switches having heaters connected in series with the motor, and a main power supply switch to close the circuit to said heaters and said motor.

References Cited in the file of this patent

UNITED STATES PATENTS

| | | |
|---|---|---|
| 2,328,743 | Roters | Sept. 7, 1943 |
| 2,458,100 | Roters | Jan. 4, 1949 |